United States Patent [19]

Leonard et al.

[11] Patent Number: 4,867,558

[45] Date of Patent: * Sep. 19, 1989

[54] METHOD OF REMOTELY DETECTING SUBMARINES USING A LASER

[75] Inventors: Donald A. Leonard, Cupertino; Harold E. Sweeney, Menlo Park, both of Calif.

[73] Assignee: GTE Government Systems Corporation, Stamford, Conn.

[*] Notice: The portion of the term of this patent subsequent to Sep. 19, 2006 has been disclaimed.

[21] Appl. No.: 64,375

[22] Filed: Jun. 22, 1987

[51] Int. Cl.4 .............................................. G01B 9/02
[52] U.S. Cl. ..................................... 356/43; 356/349; 374/117
[58] Field of Search ......................... 356/43, 318, 349; 374/117

[56] References Cited

U.S. PATENT DOCUMENTS

| | | | |
|---|---|---|---|
| 3,474,253 | 10/1969 | Kessler | 250/216 |
| 3,903,520 | 9/1975 | Shostak | 342/22 |
| 4,123,160 | 10/1978 | Caputo et al. | 356/301 |
| 4,411,525 | 10/1983 | Ogawa | 356/318 |

Primary Examiner—Richard A. Rosenberger
Attorney, Agent, or Firm—Douglas M. Gilbert; John F. Lawler

[57] ABSTRACT

Subsurface waves in a body of water such as an ocean caused by a submarine are remotely nonacoustically detected by monitoring subsurface water temperatures using a laser. A pulsed laser beam is directed into the water to at least the depth of the thermocline and an analysis is made of the resultant Brillouin and Rayleigh backscatter components. Wavelength shifted Brillouin scatter is mixed with the unshifted Rayleigh scatter in a self-heterodyne manner for each volume element of illuminated water, and the frequency of the heterodyne signal is measured and converted into temperature. This produces the desired temperature-depth profile of the water enabling detection of internal waves generated by submarines.

8 Claims, 4 Drawing Sheets

METHOD OF REMOTELY DETECTING SUBMARINES USING A LASER

RELATED APPLICATION

This application is related to application Ser. No. 064,371 filed June 22, 1987, and entitled "APPARATUS FOR AND METHOD OF REMOTELY SENSING SUB-SURFACE WATER TEMPERATURES."

BACKGROUND OF THE INVENTION

1. Field of the Invention

The present invention relates to anti-submarine warfare (ASW) technologies and more particularly to a non-acoustic technique for remotely sensing the presence of submerged submarines from an aircraft or a surface ship.

2. Description of the Prior Art

The detection and localization of submerged submarines has traditionally has been dependent primarily on passive acoustic techniques and or magnetic anomaly detection. A major disadvantage of acoustic techniques is the loss of detection capability with advances in the development of noiseless or "silent" submarines. Another disadvantage is the cost and time required to install and maintain large numbers of submerged acoustic sensing devices over wide areas of the ocean in order to achieve the objective.

A submarine detection technique that avoids this disadvantage uses the internal waves created by a moving submarine as the sensed parameter. Internal waves are subsurface waves found between layers of water of different density or within ocean layers where vertical density gradients exist. [see "The Encyclopedia of Oceanography," Vol. I, Rhodes Fairbridge Edition, pages 402–408 (Reinhold Publishing Corp., New York, 1966)]. One way to measure such internal waves is to construct a profile of ocean water temperatures as a function of depth. A technique employed in the past for measuring such profiles involves the use of many temperature sensing elements (thermistors) spaced on a cable and towed by a ship. This is costly, time consuming and generally unsuited to high spatial and temporal resolution coverage of large ocean areas. Furthermore, the technique cannot be used for mapping ocean temperature profiles, that is, temperatures over wide areas of water, because the measuring time is too long compared to the time over which sea temperatures vary.

Another method of measuring ocean temperature-depth profiles is described in U.S. Pat. No. 4,123,160 in which a laser beam illuminates the sea water and observations are made of the Raman scatter from the monomer and hydrogen bonded polymeric forms of water, the ratio of which is a function of temperature. This technique is vulnerable to interference from high background illumination, such as sunlight, because of the relatively wide optical bandwidth of the Raman scattering. Furthermore, in this method there is differential absorption over the Raman band as light transits the water column. Depolarization effects of the water column also limit the effectiveness of the technique when polarization spectroscopy is employed.

Still another laser remote sensing method has been used in limited experiments, see "SPEED OF SOUND AND TEMPERATURE IN THE OCEAN BY BRILLOUIN SCATTERING" by Hirschberg, et al., *Applied Optics*, August 1984, pages 2624–2628, inclusive. This method relies on the wavelength shift associated with Brillouin scattering from the water. This shift, however, is small so that extremely high resolution is required in optical measurement of the wavelength shift. Typically a Fabry-Perot interferometer is used to resolve the Brillouin shift. However, an interferometer requires a well collimated light source which generally is incompatible with remote sensing applications where, because of spreading, light must be collected from a much larger field of view than is possible with an interferometer.

This invention is directed to submarine detection by the measurement of sub-surface ocean temperatures while avoiding the foregoing disadvantages.

A general object of the invention is the provision of a method of sub-surface submarine detection by remotely and rapidly measuring ocean temperature profiles without interference from high background illumination, such as sunlight.

Another object is the provision of a method of sub-surface submarine tracking by remotely measuring ocean temperature profiles without the need for a precision interferometer.

A further object is the provision of such a method that permits submarine detection long after the vessel has passed the search area.

SUMMARY OF THE INVENTION

These and other objects of the invention are achieved by using the "self-heterodyne" of the wavelength-shifted Brillouin scatter with the unshifted Rayleigh scatter mainly from impurities in the water. The "self-heterodyne" action allows mixing of these signals from each volume element of the illuminated water column independently and measuring the frequency of the heterodyne signal. Since this frequency is directly related to the water temperature and since time is directly proportional to depth, the resultant time-temperature pattern is equivalent to a temperature-depth profile. Submarine-created internal waves affect this profile so as to provide a long-persisting indication of movement of the submerged vessel.

BRIEF DESCRIPTION OF THE DRAWINGS

For a better understanding of the invention as well as other objects and further features thereof, reference is made to the following description which is to be read in conjunction with the accompanying drawings wherein.

It should be noted that the same reference numerals identify identical components in each of the figures.

DESCRIPTION OF PREFERRED EMBODIMENT

For a better understanding of the subject invention, reference is made to the following description and appended claims in conjunction with the above-described drawings.

Figure 1:
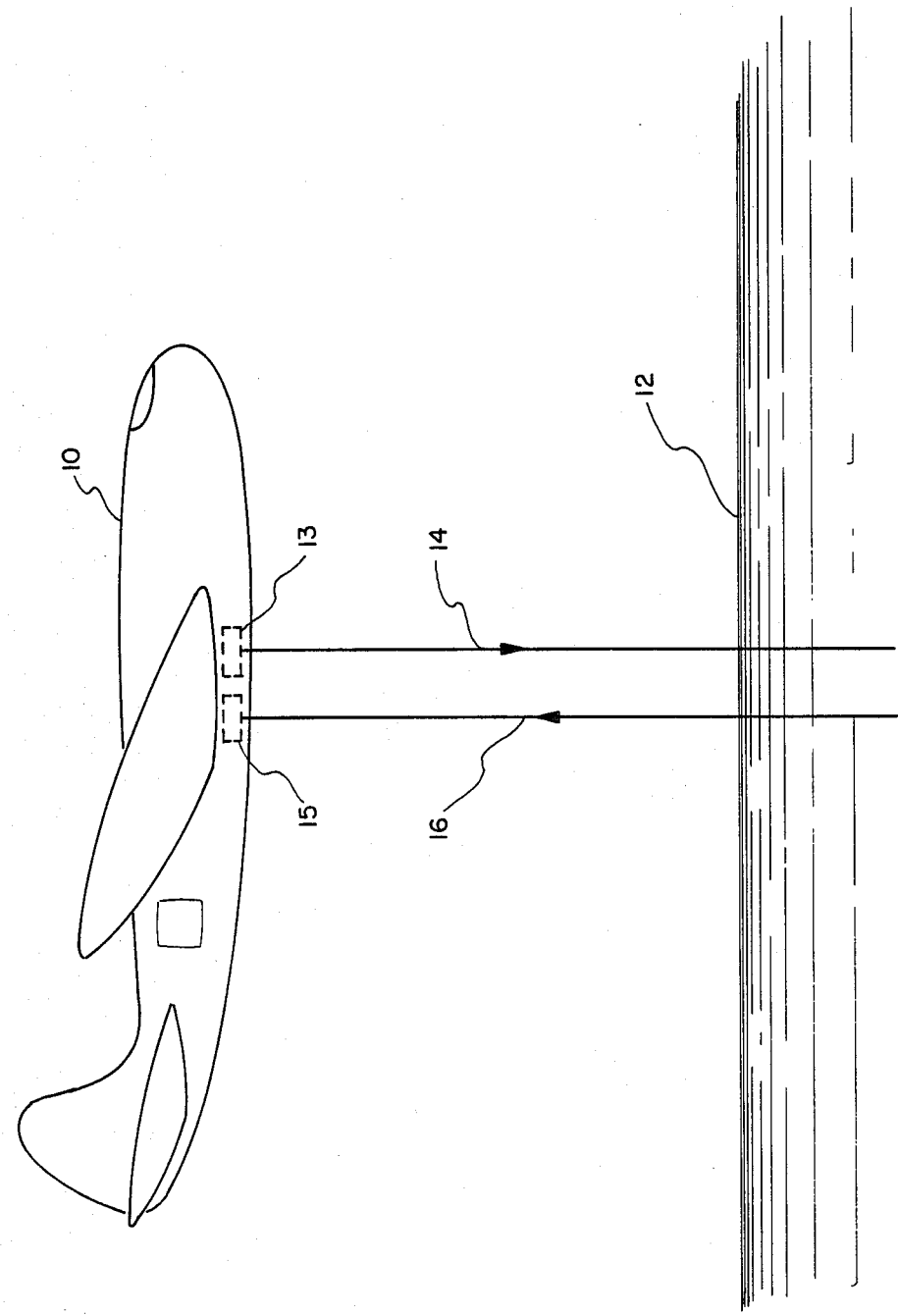
FIG. 1 is a schematic view of an aircraft over a body of water and engaged in the practice of the invention.

Referring now to the drawings, FIG. 1 depicts an aircraft 10 in flight at a predetermined altitude over a body 12 of water such as an ocean having a transmitter 13 for directing a laser beam 14 into the water and a receiver 15 for receiving a return signal 16 from the water. Transmitter 13 generates a pulsed output beam 14 having a wavelength selected to penetrate the water 12, and return signal 16 contains Brillouin and Rayleigh backscatter components. In accordance with this invention, receiver 15 processes the Brillouin and Rayleigh signals to produce data indicative of the temperature at various depths to provide temperature-depth information.

Figure 2:
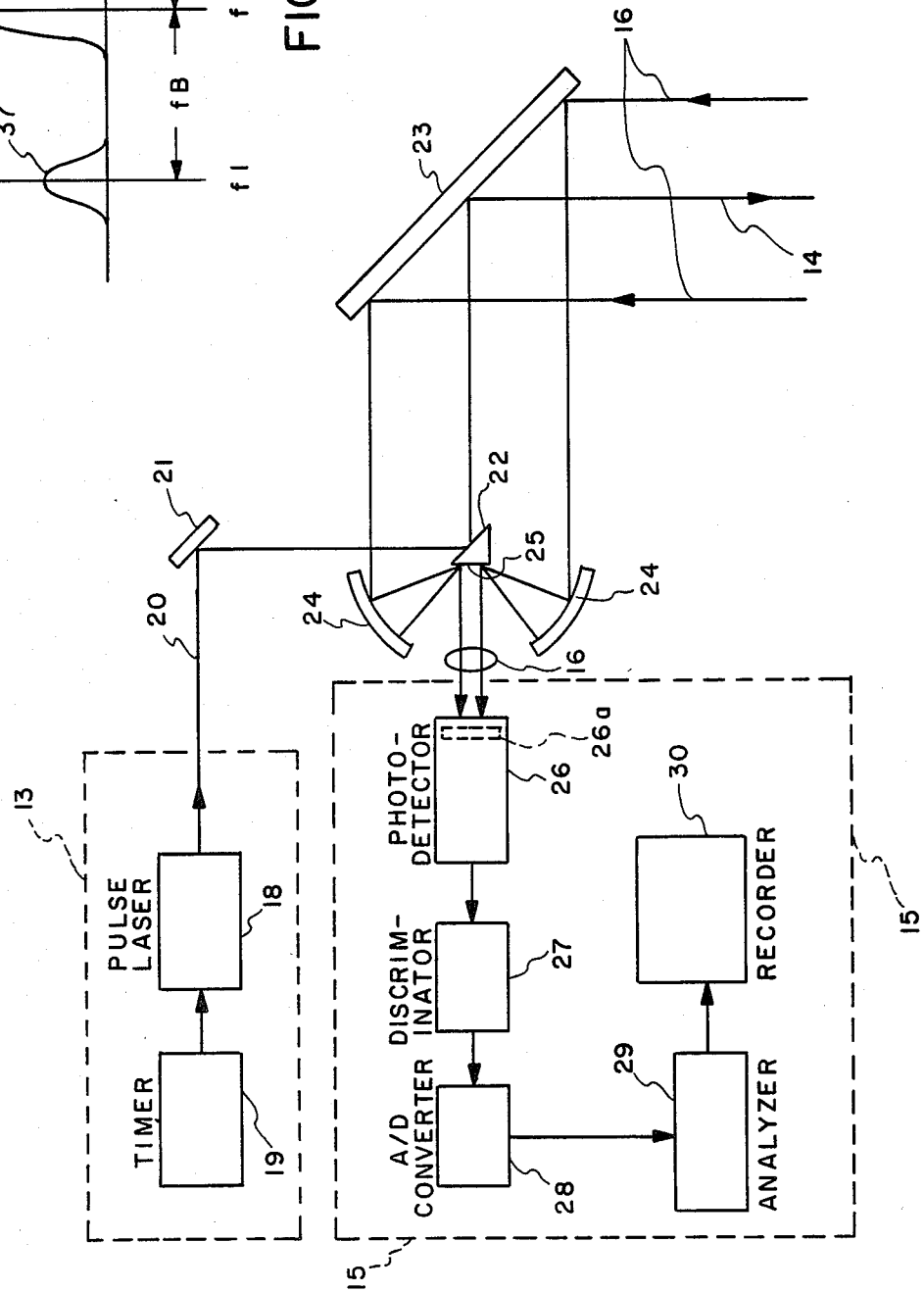
FIG. 2 is a schematic block diagram of the transmitter and receiver components comprising the apparatus embodying the invention.

A more detailed block diagram of transmitter 13 and receiver 15 along with associated optics is shown in FIG. 2. Transmitter 13 comprises a laser 18 controlled by a timer 19 to produce output laser pulses 20. The output of laser 18 preferably is in the blue-green portion of the spectrum (4500 to 5500 Å in wavelength) and has a typical pulse repetition frequency of 100 Hz. A laser useful for this purpose is a frequency doubled Nd:YAG at a wavelength of 5300 Å. Laser output 20 is directed by mirrors 21, 22 and 23 to the target area, in this application, sea water 12 below aircraft 10.

Return signal 16 containing Brillouin and Rayleigh backscatter components resulting from the interaction of the laser pulses with the sea water are directed by mirrors 23, 24 and 25, to the receiver 15 comprising photodetector 26 having a cathode 26a, discriminator 27, analog to digital converter 28, analyzer unit 29 and a recorder 30. Photodetector 26 preferably is a photomultiplier tube having a photocathode on which return signal 16 is incident and which converts the optical energy (photons) to electrons (current) while simultaneously amplifying the energy. The photocathode also performs the additional important function of mixing the Brillouin and Rayleigh components of signal 16 to provide a difference frequency, called the optical heterodyne frequency. The Brillouin backscatter component is frequency-shifted by the acoustic properties of the water whereas the Rayleigh backscatter component has a constant frequency and is analogous to the "local oscillator" in a superheterodyne receiver. The acoustic velocity of the water is a function of water temperature.

Figure 3:
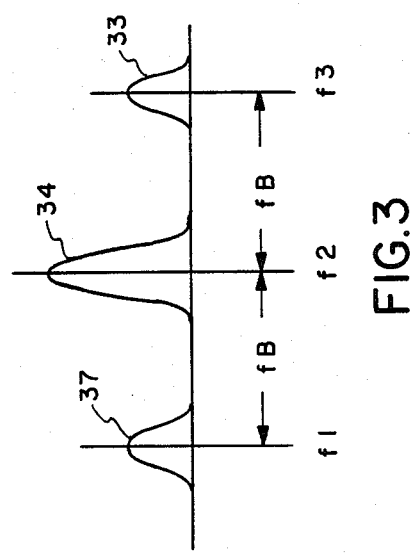
FIG. 3 is a diagram illustrating frequency products resulting from mixing Rayleigh and Brillouin backscatter components in accordance with the practice of the invention.

Referring now to FIG. 3, the Brillouin and Rayleigh components incident on cathode 26a of photodetector 26 are represented by curves 37 and 33 at frequencies $f_1$ and $f_3$, respectively, and by curve 34 at frequency $f_2$. The signals at frequencies $f_1$ and $f_3$ are the frequency-shifted Brillouin components and the signal at $f_2$ is the frequency-unshifted Rayleigh component, the latter functioning as a "local oscillator" in an analogy to a superheterodyne receiver. The two difference frequencies $f_B$ between $f_3$ and $f_2$ and between $f_2$ and $f_1$ are the same and are additive in the baseband so that the process results in increased sensitivity. Moreover, the phase relationship of the Brillouin and Rayleigh components at photodetector 26 is correct for efficient heterodyning since both components are received from the same angle of view however wide and are produced by the same laser pulse stream.

The output (current) of photodetector 26 passes to discriminator 27, such as a delay line discriminator, which produces a voltage proportional to the baseband frequency $f_B$. Converter 28 changes the output of discriminator 27 into digital form for analysis in analyzer 29. Analyzer 29 receives the digital frequency $f_B$ and, using the equations below, translates it into a signal or number representative of the water temperatures. By way of example, analyzer 29 may comprise a computer which compares the digital frequency input with a reference table to derive the equivalent temperature. The output of analyzer 29 is stored in recorder 30.

Figure 5:
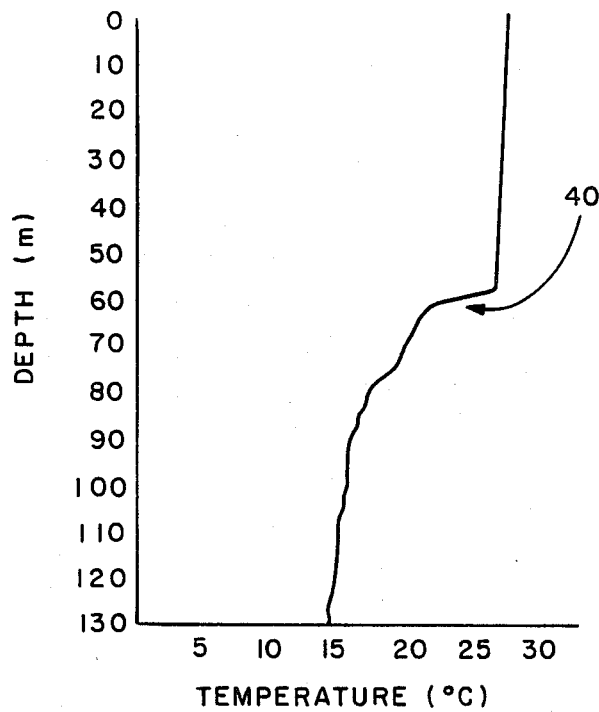
FIG. 5 is typical ocean temperature-depth curve showing the thermocline.

In typical ocean water, the vertical temperature profile, see FIG. 5, exhibits a reasonably well-defined depth where a marked gradient exists. The surface temperature changes to that of deep water at this point, indicated at 40 and is called the thermocline. As the density of water is dominated by its temperature, thermocline 40 represents the boundary layer between waters of different density.

Figure 6:
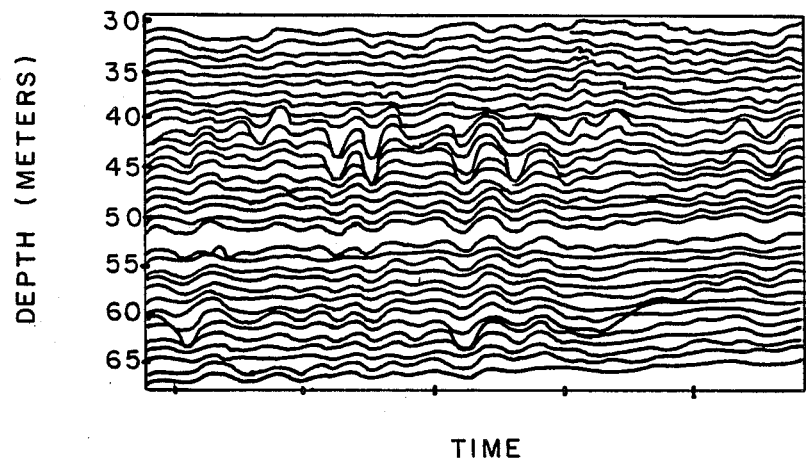
FIG. 6 is a plot of depths of constant temperature, or isotherms versus time showing internal waves.

As in all density boundaries, wave action can be supported, see "The Enclyclopedia of Oceanography", supra. The existence of internal waves in the main thermocline 40 may be 20–50 feet high and are exhibited by temperature profiles such as the pattern of "isotherms," i.e., isothermal contours, shown in FIG. 6. Another such profile is a map of temperatures at constant depths. Internal wave patterns are thus mapped wherever and whenever they exist and provide a direct indication of the wake of a submarine.

Because the density gradient at thermocline 40 is relatively weak (compared to the gradient at the air-water boundary) and because of the water viscosity, the internal waves have long periods (many minutes) and persist for long times (large fractions of hours). The motion of submerged submarines near the thermocline depth generate unique patterns of internal waves. Because of the persistence of these waves, the pattern may be detected long after the passage of the submarine. This enhances the detectability of the submarine because only the long-persistent wake in the internal waves need be detected rather than the submarine itself. Tracking the wake will quickly locate the vessel itself.

Another underwater disturbance created by a submarine and detectable in accordance with this invention is the "thermal scar" left by the power plant coolant discharge. A submarine cools its prime power plant by using surrounding sea water. The excess heat in the coolant water discharge leaves a trail of relatively warmer water as the submarine moves. The thermal scar persists until the heat is dissipated and provides a long persistent indication of the presence of the submarine.

The accuracy of temperature measurement by analysis of Brillouin backscatter may be shown mathematically. The relation of signal-to-noise ratio (SNR) to the standard deviation of frequency measurement accuracy for a radar is given by $$\text{std dev }(f) = [2\pi T_o \sqrt{(2 SNR)}]^{-1} \qquad (1)$$

This standard deviation of the frequency also depends on a parameter $T_o$ which is usually taken to be the laser pulse width. In this case, however, the self broadening of the Brillouin shifted lines produces a Brillouin bandwidth of 480 MHz (See Hirschberg, J. G., et al, "SPEED OF SOUND AND TEMPERATURE IN THE OCEAN BY BRILLOUIN SCATTERING,"

*Applied Optics,* 23, 2624 (1984)). This requires that an effective $T_o$ of 2.1 ns be used in equation (1) rather than the laser pulse duration.

The Brillouin backscatter frequency $f_B$ is a function of the acoustic velocity $v_s$ and the laser optical frequency, $f_o$, as follows $$f_B = 2nV_s(1/c)f_o \quad (2)$$

where n is the index of refraction and c is the velocity of light in free space.

Differentiating equation (2) with respect to temperature yields $$df_B/dT = 2n(1/c)f_o\, dv_s/dT \quad (3)$$

The sound velocity $v_s$ is given as a function of temperature by the following expression $$v_s = 1400 + 5.02T - 0.055T^2 + 0.003T^3 \quad (4)$$

which when differentiated with respect to temperature and evaluated at 10° C. gives $dv_s/dT = 4.82$ m/s−°C. Substituting this value into equation (3) and using $6.54 \times 10^{14}$ Hz as the optical frequency for an assumed transmitter wavelength of 459 nm, the result obtained is $$df_B/dT = 27.95 \text{ MHz/°C}. \quad (5)$$

Figure 4:
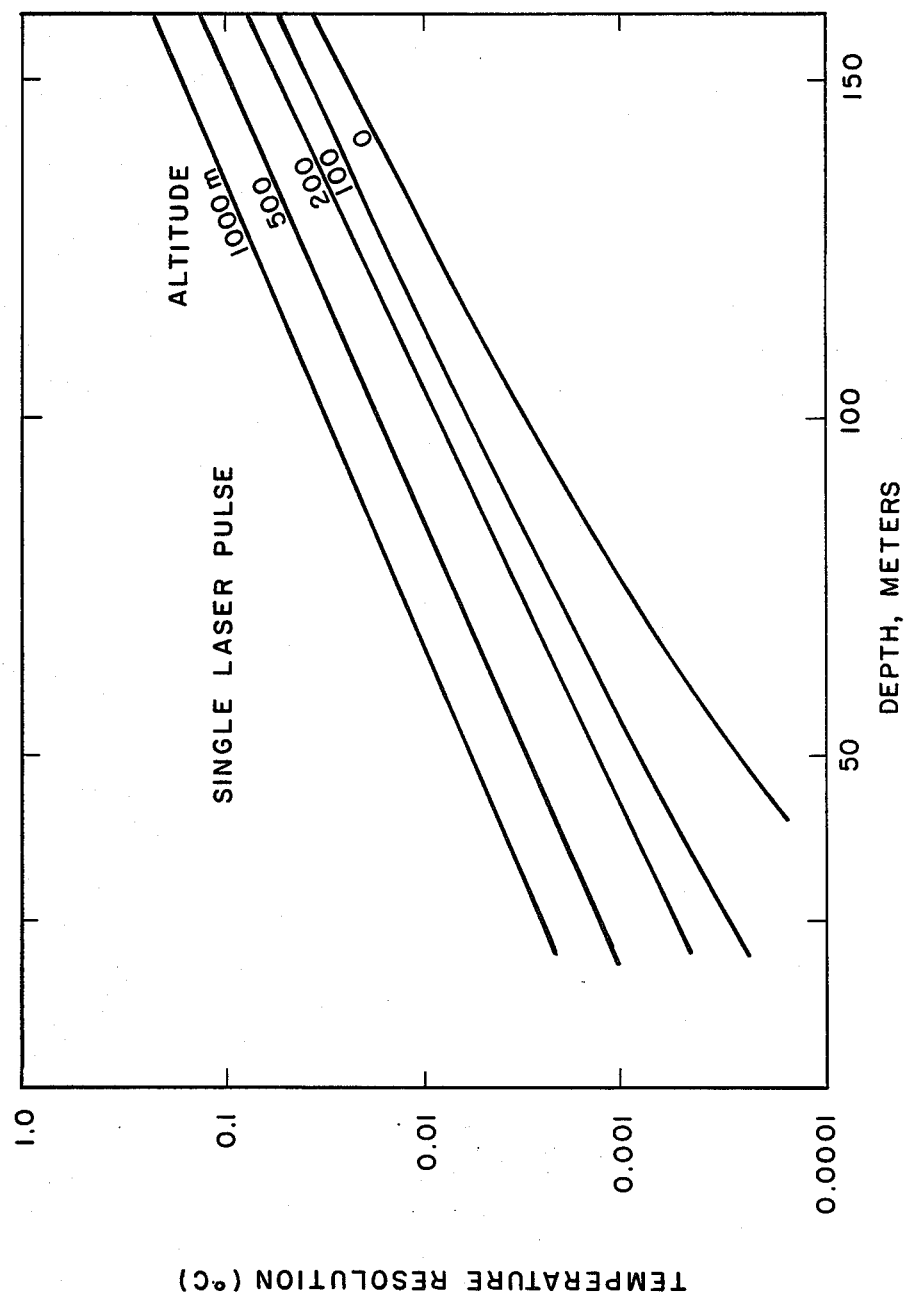
FIG. 4 is a set of curves depicting the relation of ocean temperature resolution and depth for different monitoring altitudes.

The temperature accuracy as a function of SNR can be obtained by dividing equation (1) by $df_b/dT$. The resultant temperature accuracy expressed as a function of depth for a representative system is shown in FIG. 4.

What is claimed is:

1. A method of detecting from a remote location a submarine under the surface of a body of water comprising the steps of:

generating a beam of pulsed laser light capable of penetrating said water;

directing said beam into said water to at least the depth of the thermocline;

detecting the Rayleigh and Brillouin backscatter light components produced by the interaction of said beam with said water;

mixing said Rayleigh and Brillouin light components and thereby producing a heterodyne current having a frequency $f_B$;

converting the heterodyne current frequency into a temperature profile; and translating said temperature profile into spatial patterns for comparison with patterns characteristic of the wake of a moving submarine.

2. The method according to claim 1 in which said spatial patterns constitute isothermal contours.

3. The method as in claim 2 including, prior to the translating step, the step of repeating the above steps over an area of said body of water thereby creating a library of temperature profiles.

4. The method of claim 3 wherein said first six steps are carried out in a ship moving across said body of water.

5. The method of claim 2 wherein said first six steps are carried out in an airplane traveling above said body of water.

6. The method of claim 5 including the step of periodically repeating the first six steps by traversing said beam othogonal to the direction of travel of said plane, thereby sweeping an area of ocean with a single pass over the selected area.

7. The method according to claim 1 in which said spatial patterns constitute temperature at constant depths.

8. The method according to claim 1 with the additional step of tracing said wake to determine the location of the submarine.

* * * * *